M. J. PODZEAMSKI.
ROTARY BAKING OVEN.
APPLICATION FILED APR. 25, 1919.

1,318,460.

Patented Oct. 14, 1919.

WITNESS
J. P. Britt

INVENTOR
Mike J. Podzeamski
BY Young & Young
ATTORNEYS

UNITED STATES PATENT OFFICE.

MIKE J. PODZEAMSKI, OF MILWAUKEE, WISCONSIN.

ROTARY BAKING-OVEN.

1,318,460.   Specification of Letters Patent.   Patented Oct. 14, 1919.

Application filed April 25, 1919. Serial No. 292,597.

*To all whom it may concern:*

Be it known that I, MIKE J. PODZEAMSKI, a citizen of Russia, and resident of Milwaukee, in the county of Milwaukee and State of Wisconsin, have invented certain new and useful Improvements in Rotary Baking-Ovens; and I do hereby declare that the following is a full, clear, and exact description thereof.

My invention relates to new and useful improvements in baking ovens of that type comprising a casing having heat supply means such as a row of gas jets in its lower portion and having a series of pan-racks therein adapted for continuous movement during the baking operation to procure a uniform application of heat thereto.

It is in general the object of my invention to simplify and otherwise improve the structure and to increase the efficiency of ovens of this character.

It is more particularly an important object of my invention to provide an arrangement whereby the moving pan racks may be caused to move in the paths of heated gases from the burners for a maximum proportion of their traveling cycle, and it is a more detailed object in this connection to provide an arrangement for causing the pan racks to move in substantially straight paths upwardly divergent from the heating means of the oven.

With the above and other objects and advantages in view, which will be apparent as the description proceeds, my invention resides in the novel features of construction, combination and arrangement of parts, which will be hereinafter more particularly described and defined by the appended claims.

Figure 1:
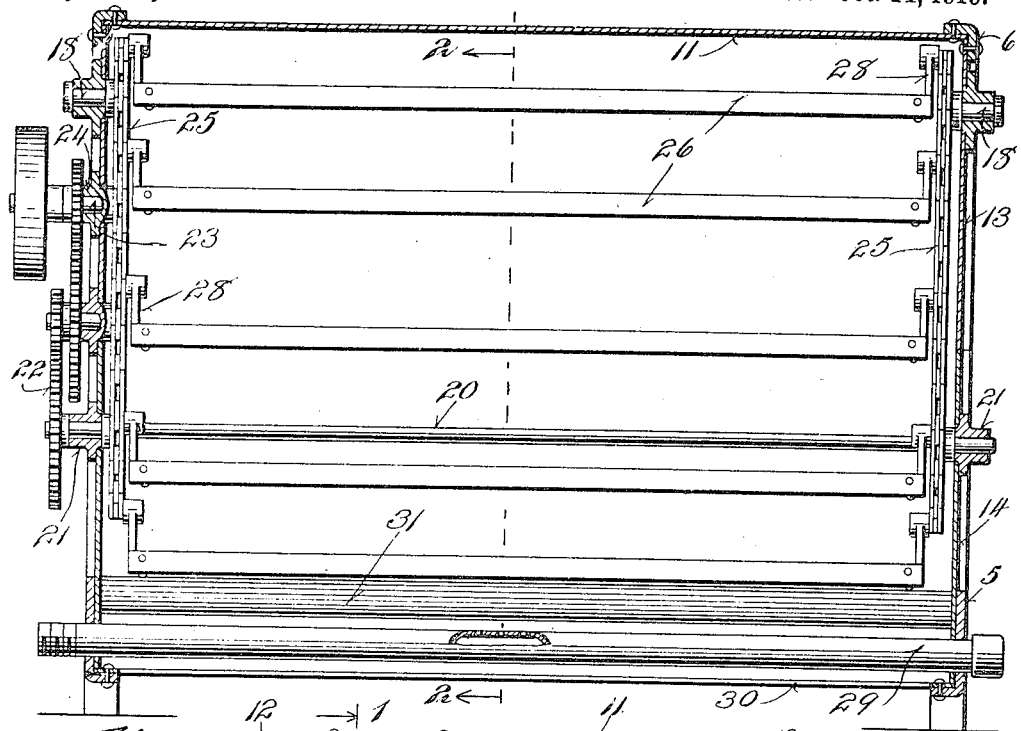
Figure 1 is a longitudinal sectional view through an oven constructed in accordance with my invention, the planes of this section being indicated by the broken line 1—1 of Fig. 2.
Figure 2:
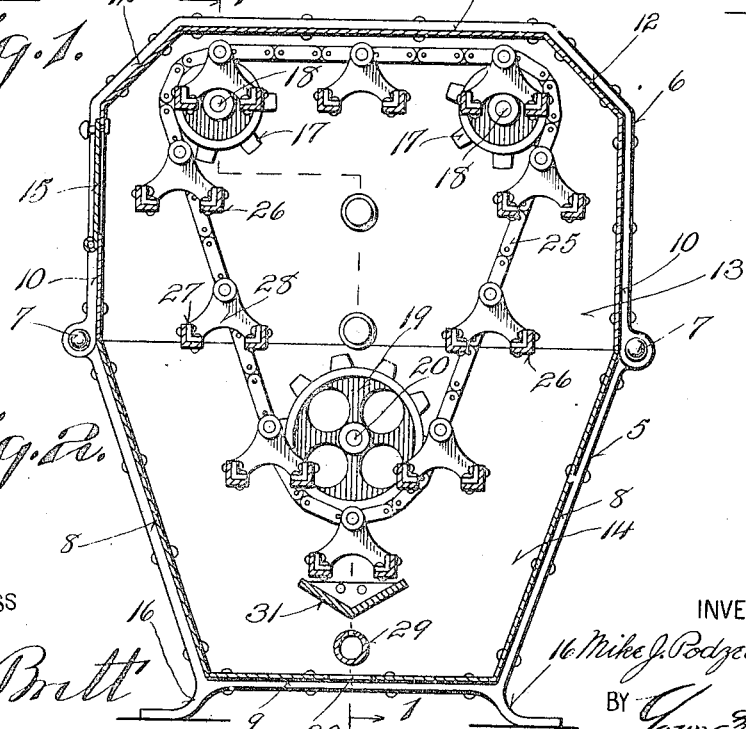
Fig. 2 is a transverse sectional view through the oven on a plane indicated by the line 2—2 of Fig. 1.

Referring now more particularly to the accompanying drawings, the casing of my improved oven is preferably formed in separable sections for convenience in transportation and assembly and comprises lower end head portions 5 of substantially U-shape and upper end head portions 6 of substantially inverted U-shape, the end head portions being secured together by bolts 7 passed through the lapped free ends of their legs. Each of the end head portions is angular in cross-section and the lower portions have side wall portions 8 secured thereto, said side wall portions being continued about the bight of the end head portions to form the bottom 9, and inasmuch as the legs of the lower end head portions are divergent, the wall portions 8 are correspondingly inclined outwardly. Upper side wall portions 10 are secured to the legs of the upper head section 6, being continued about the bights of the upper head sections to form the top 11, the legs and wall portions being inclined inwardly at 12 adjacent the top to avoid objectionable corner space. Upper and lower end wall portions 13 and 14 respectively are secured to the head portions to complete the casing. A door 15 is provided in one of the upper wall portions 10 to afford access to the interior of the oven for inserting and removing the bread pans. Supporting legs 16 are provided at the ends of the bight of the lower head portions 5.

An exceedingly simple and strong casing structure is thus provided, which may be shipped in telescoping sections and readily assembled for use.

For supporting and moving the pan racks of the oven, a pair of sprocket wheels 17 are carried by idle stub shafts 18 at the upper corner portions of each end wall and a pair of drive sprocket wheels 19 are mounted adjacent the inner faces of the lower end wall portions 14 on a shaft 20 which extends through and is journaled in bearings 21 carried intermediately by said end wall portions 14. This shaft is driven by a reducing train of gears 22 extending from a pulley stub shaft 23 journaled in a bearing 24 carried by one of the upper end wall portions 13. A sprocket chain 25 is trained about each of the sets of sprocket wheels and the pan racks of the oven are carried by the sprocket chains, each pan rack comprising a pair of pan seating angle bars 26 having their ends secured to inward angular extensions 27 of a pair of triangular end plates 28 which have their upper corner portions pivotally suspended from the sprocket chains 25 whereby the pan racks are maintained in level position in their travel about the paths of the sprocket chains.

A heat supply means, preferably a gas burner pipe 29 extends longitudinally through the bottom portion of the casing and the flames from this pipe are supplied with air through a draft-slot 30 extending longitudinally in the casing bottom 9 immediately under the burner pipe. A deflector plate 31 is disposed above the burner pipe, being preferably of a wide V-shape in cross section to provide deflector surfaces inclined upwardly from the vertical plane of the axis of the burner pipe, and it is noted that the sprocket wheels 19 are so disposed with relation to the deflector plate that the pan racks, in passing about the sprocket wheels, move directly above the plate.

By the recited relation of the sprocket wheels, the chains 25, and consequently the pan racks carried thereby move in practically straight paths which are upwardly convergent from a point adjacent and immediately above the source of heat, and these paths of movement coincide with the normal upward paths of the heated gases from the burner, particularly as deflected by the plate 31. Thus, the pan racks are subjected to the influence of the heated gases throughout the major portions of their upward and downward travel, and by providing straight upper stretches of the sprocket chains, a maximum and even heat is imparted to the pans as they travel across the upper portion of the casing, it being noted that the heat would tend to collect at the highest point of the upper portion of the casing, which is straight in my structure.

The foregoing advantages are in particular contradistinction to those types of ovens wherein the pan racks are carried by rotating heads to thus travel in a circular path and thus move quite rapidly into and out of the upward paths of the hot gases. My device at the same time effects a simplification of structure in the elimination of these rotating end heads, the operating stresses of my structure being also distributed at three points at each end of the casing. It is noted that the inclination of the upward and downward paths of travel of the pan racks is substantially equal to the inclination of the side wall portions 8, thus further tending to direct the flow of heated gases in coincidence with the paths of travel of the pan racks. It is further noted that by moving the pan racks about the peripheral path of the single wheels 19 at the lower portion of the casing, the pan racks move rapidly to and from immediate proximity to the heat supply means in changing their direction of travel.

While I have shown and described a preferred embodiment of my invention, it will be appreciated that various changes and modifications of structure to meet differing conditions of use and manufacture may be employed without departing in any manner from the spirit of my invention.

What is claimed is:

1. A baking oven of the class described comprising a casing having an open interior, a sole source of heat supply in the lower portion of the casing, a series of pan racks in the casing and means for moving said pan racks continuously in paths extending divergently upwardly from the heat supply means, each of said paths being inclined outwardly with respect to the vertical central plane of the casing.

2. A baking oven of the class described having an open interior and having upwardly divergent side wall portions, each side wall portion being inclined outwardly with respect to the central vertical plane of the casing, said casing having a substantially flat top wall portion, a sprocket chain in each end portion of the casing, sprocket wheels supporting said chains and holding the chains in side stretches extending divergently in correspondence with the divergence of the casing side wall portions and in top stretches extending substantially parallel to the flat top of the casing, pan racks extending between and carried by the chains, means for driving the chains, and a sole source of heat supply extending longitudinally in the bottom portion of the casing.

3. A baking oven of the class described comprising a casing, a burner pipe extending longitudinally in the bottom portion of the casing, a longitudinal draft slot in the bottom of the casing immediately under the burner pipe, a series of pan racks, means for progressively moving said pan racks in upward and downward paths extending divergently from a point above the burner pipe, and a baffle plate disposed between the burner pipe and the paths of movement of the pan racks.

In testimony that I claim the foregoing I have hereunto set my hand at Milwaukee, in the county of Milwaukee and State of Wisconsin.

MIKE J. PODZEAMSKI.